(12) United States Patent
Hsieh et al.

(10) Patent No.: US 11,047,358 B2
(45) Date of Patent: Jun. 29, 2021

(54) SYSTEMS AND METHOD FOR HARMONIZING KNOCK IN ENGINE CYLINDERS

(71) Applicant: Cummins Inc., Columbus, IN (US)

(72) Inventors: Ming-Feng Hsieh, Nashville, IN (US); Omkar Harshe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/961,443

(22) PCT Filed: Jan. 11, 2019

(86) PCT No.: PCT/US2019/013181
§ 371 (c)(1),
(2) Date: Jul. 10, 2020

(87) PCT Pub. No.: WO2019/140182
PCT Pub. Date: Jul. 18, 2019

(65) Prior Publication Data
US 2021/0079882 A1    Mar. 18, 2021

Related U.S. Application Data

(60) Provisional application No. 62/616,664, filed on Jan. 12, 2018.

(51) Int. Cl.
*F02P 5/152* (2006.01)

(52) U.S. Cl.
CPC .................. *F02P 5/1522* (2013.01)

(58) Field of Classification Search
CPC .. F02P 5/1522; F02P 5/04; F02P 5/145; F02P 5/15; F02P 5/152; F02P 17/12;
(Continued)

(56) References Cited

U.S. PATENT DOCUMENTS 4,271,799 A * 6/1981 Kato ................. F02P 5/152
                                                        123/406.38
4,331,117 A    5/1982 Ginsburgh
(Continued)

FOREIGN PATENT DOCUMENTS

WO    WO-2014/042847    8/2013

OTHER PUBLICATIONS

International Search Report and Written Opinion for International Application No. PCT/US2019/013181, dated Mar. 14, 2019, 8 pages.

*Primary Examiner* — George C Jin
(74) *Attorney, Agent, or Firm* — Foley & Lardner LLP (57) ABSTRACT

A system for harmonizing knock in a plurality of cylinders included in an engine, the system comprises a plurality of knock sensors, and a controller coupled to each of the plurality of knock sensors. The controller is configured to receive a plurality of cylinder knock values corresponding to each of the plurality of knock sensors, and receive an average knock value. The controller determines a cylinder spark timing offset value for each cylinder in the plurality of cylinders from the average knock value and the cylinder knock values. The controller determines an average spark timing offset value. The controller also determines an adjusted spark timing value for each of the plurality of cylinders by subtracting the average spark timing offset value from a spark timing value of each of the plurality of cylinders.

20 Claims, 4 Drawing Sheets

(58) Field of Classification Search
CPC .. F02P 2017/128; F02D 35/02; F02D 35/027; G01L 23/221; G01L 23/225; G01L 23/226; G01L 23/227; G01L 2023/228
See application file for complete search history.

(56) References Cited

U.S. PATENT DOCUMENTS

| | | | | |
|---|---|---|---|---|
| 4,535,738 | A | * | 8/1985 | Ma ................... F02P 5/1455 |
| | | | | 123/406.12 |
| 4,716,874 | A | | 1/1988 | Hilliard et al. |
| 4,745,901 | A | * | 5/1988 | Reifenberger ........... F02P 11/02 |
| | | | | 123/406.47 |
| 4,903,664 | A | | 2/1990 | Shinshi |
| 5,924,404 | A | | 7/1999 | Ruman et al. |
| 6,185,984 | B1 | | 2/2001 | Takahashi |
| 6,247,448 | B1 | | 6/2001 | Scholl et al. |
| 7,370,634 | B2 | | 5/2008 | Christman et al. |
| 8,406,984 | B2 | | 3/2013 | Glugla et al. |
| 2002/0007818 | A1 | | 1/2002 | Lodise et al. |
| 2011/0247587 | A1 | * | 10/2011 | Chen ................. F02D 41/0002 |
| | | | | 123/339.19 |
| 2015/0083080 | A1 | | 3/2015 | Leone et al. |
| 2015/0316019 | A1 | * | 11/2015 | Kimura ................. F02P 9/002 |
| | | | | 123/406.19 |
| 2017/0089316 | A1 | * | 3/2017 | Sartoni ............... F02D 41/0025 |

* cited by examiner

SYSTEMS AND METHOD FOR HARMONIZING KNOCK IN ENGINE CYLINDERS

CROSS-REFERENCE TO RELATED APPLICATION

The present application claims priority to and the benefit of U.S. Provisional Patent Application No. 62/616,664, filed Jan. 12, 2018 and entitled "Systems and Methods for Harmonizing Knock in Engine Cylinders," which is incorporated herein by reference in its entirety.

TECHNICAL FIELD

The present disclosure relates generally to control systems for controlling and harmonizing knock in a plurality of engine cylinders.

BACKGROUND

Internal combustion (IC) engines include one or more engine cylinders structured to receive a fuel and ignite the fuel so as to produce mechanical power. Spark ignition IC engines use an ignition source (e.g., an electric arc produced by a spark plug coupled to the engine cylinder) to ignite a charge (i.e., an air/fuel mixture). IC engines can be susceptible to knock which occurs when combustion of an air/fuel mixture (e.g., air mixed with gasoline, natural gas, liquid petroleum gas, alcohol, diesel or any other fuel or combination thereof) occurs prematurely or unexpectedly (e.g., before a piston of the engine has a reached a top dead center during a compression stroke or not during the compression stroke in a four stroke engine).

Various studies have shown that engine performance and robustness of natural gas engines can be significantly improved by minimizing cylinder to cylinder combustion variation. A knock sensor mounted on each cylinder provides valuable feedback in understanding the combustion differences on a multi cylinder engine, Measurement from knock sensors is, however extremely noisy. Knocking of a cylinder has strong correlation with spark timing (ST). Therefore, timing of the spark ignition has to be precisely controlled to reduce knock.

SUMMARY

Embodiments described herein relate generally to systems and methods for harmonizing knock in a plurality of engine cylinders, and in particular to systems and methods for controlling ST of the plurality of engine cylinders by subtracting an average ST value from a ST value of each of the plurality of cylinders so as to determine an adjusted ST value for each of the plurality of cylinders.

In some embodiments, a system for harmonizing knock in a plurality of cylinders included in an engine comprises a plurality of knock sensors. A controller is coupled to each of the plurality of knock sensors. The controller is configured to receive a plurality of cylinder knock values corresponding to each of the plurality of knock sensors. The controller also receives an average knock value. The controller determines a cylinder ST offset value for each cylinder in the plurality of cylinders from the average knock value and the cylinder knock values. The controller determines an average ST offset value. The controller also determines an adjusted ST value for each of the plurality of cylinders by subtracting the average ST offset value from a ST value of each of the plurality of cylinders.

In some embodiments, a control system for harmonizing knock in a plurality of cylinders included in an engine comprises an averaging circuit configured to: receive a plurality of cylinder knock values from a plurality of knock sensors, each of the plurality of knock sensors being coupled to a corresponding cylinder of the plurality of cylinders, and determine an average knock value from the plurality of cylinder knock values; a subtractor circuit configured to determine a cylinder ST offset value for each cylinder in the plurality of cylinders from the average knock value and the cylinder knock values; an adjusted ST offset determination controller configured to: determine an average ST offset value, and determine an adjusted spark timing value for each of the plurality of cylinders by subtracting the average ST offset value from a ST value of each of the plurality of cylinders.

In some embodiments, a method comprises determining an average knock value based on a plurality of knock values associated with a corresponding plurality of cylinders of an engine, determining a cylinder ST offset value for each cylinder in the plurality of cylinders from the average knock value and the cylinder knock values, determining an average ST offset value, and determining an adjusted ST value for each of the plurality of cylinders by subtracting the average ST offset value from a ST value of each of the plurality of cylinders.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF FIGURES

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting.

Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for harmonizing knock in a plurality of engine cylinders, and in particular to systems and methods for controlling ST of the plurality of engine cylinders by subtracting an average ST value from a ST value of each of the plurality of cylinders so as to determine an adjusted ST value for each of the plurality of cylinders.

In IC engines, the air-fuel mixture is meant to be ignited at a precise point in a piston stroke of the engine. Knock occurs when the peak of the combustion process no longer occurs at the optimum moment for the engine combustion cycle, for example, a four-stroke cycle. The shock wave creates a characteristic metallic "pinging" sound, and cylinder pressure increases dramatically. Effects of engine knocking range from inconsequential to completely destructive. Knocking may reduce the power produced by the engine, loss of acceleration and decrease in fuel mileage.

Various studies have shown that engine performance and robustness of IC engines, particularly natural gas engines can he significantly improved by minimizing cylinder to cylinder combustion variation. A knock sensor mounted on each cylinder provides a valuable feedback in understanding the combustion differences on a multi cylinder engine. Measurement from knock sensors is, however extremely noisy. Knocking of a cylinder has strong correlation with spark timing. Therefore, timing of the spark ignition has to be precisely controlled to reduce knock.

Particularly, for natural gas engines, spark timing has a strong correlation with thermal efficiency. Advancing an average spark timing of the cylinders included in a natural gas engine may increase thermal efficiency. In conventional systems, the knock of an individual cylinder is monitored and controlled without regard to the knock of the other cylinders. This may result in one cylinder of the engine hitting a knock limit, but the other cylinders underperforming. Harmonizing the knock over all the cylinders, such that each of the cylinders have about the same knock, may improve performance of the engine. Particularly, controlling the knock from all cylinders to a given target potentially limits the variation in combustion and may provide robustness towards noise factors such as fuel quality or changes in ambient conditions.

Various embodiments of the systems and methods described herein may provide one or more benefits including, for example: (1) harmonizing the knock across all cylinders included in an engine so as to reduce cylinder to cylinder knock imbalance; (2) preventing any cylinder from hitting a knock limit preventing adverse effects on the engine; and (3) improving engine performance, efficiency and robustness.

Figure 1:
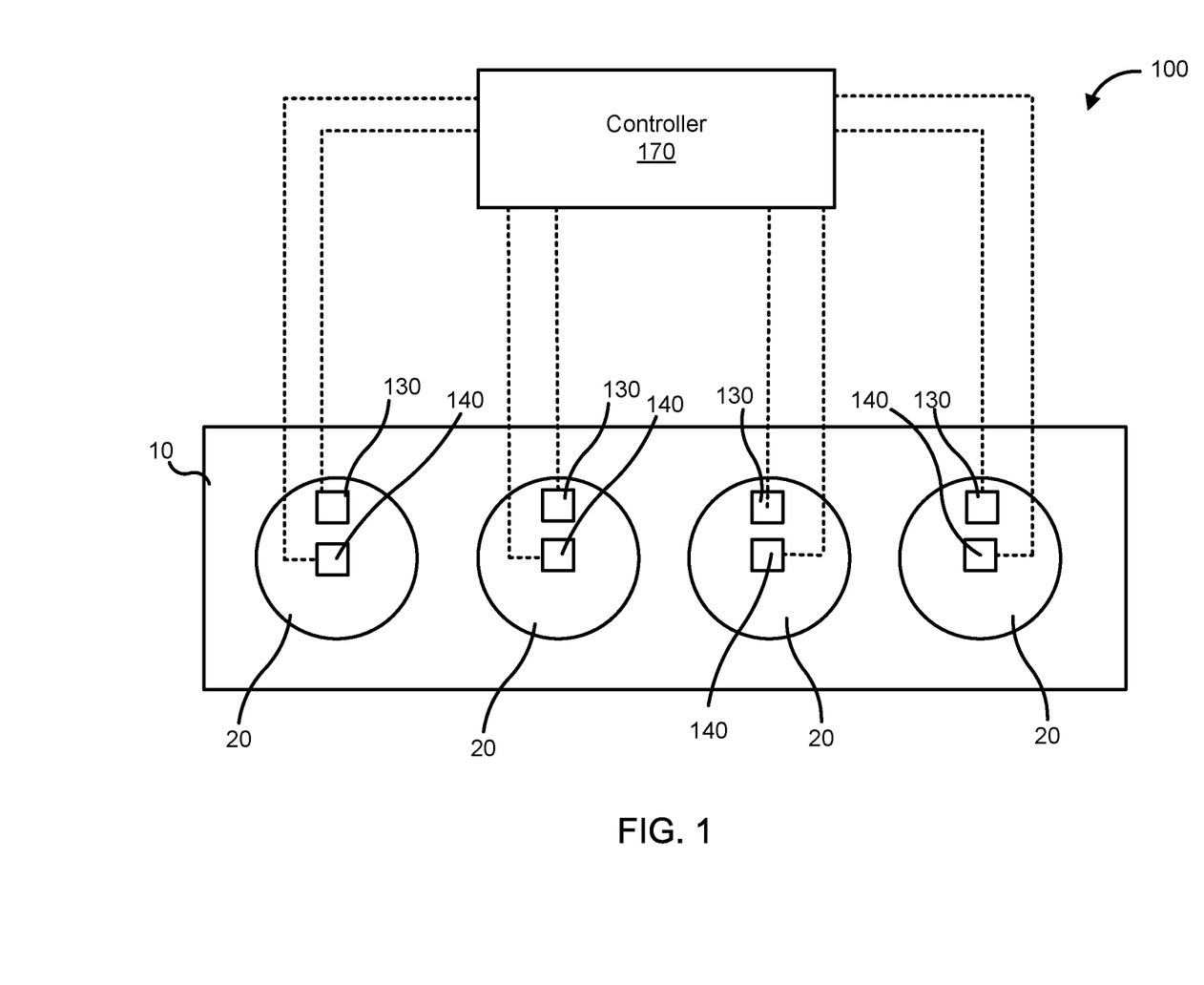
FIG. 1 is a schematic illustration of a system for harmonizing knock in a plurality of cylinders included in an engine, according to an embodiment.

FIG. 1 is a schematic illustration of a system 100 for harmonizing knock in a plurality of cylinders 20 included in an engine 10, according to an embodiment. The system 100 includes a plurality of knock sensors 130 and a controller 170, and in some embodiments, a plurality of spark ignition assemblies 140. The controller 170 is configured to adjust a ST value of each of the plurality of cylinders 20 across the plurality of cylinders 20 so as to harmonize a knock value thereof, and enhance efficiency and performance of the engine 10.

For example, the knock value is indicative of a likelihood of knock occurring in a cylinder 20. The knock value may be measured as an electrical signal (e.g., a current or voltage) which corresponds to an amount of vibration measured in a cylinder 20 of the plurality of cylinders 20, that is proportional to the knock in the respective cylinder 20. In this regard, an amount of vibration beyond a certain threshold (e.g., a measured voltage being greater than a voltage threshold) may correspond to knock occurring in the corresponding cylinder 20. As described herein, "harmonize a knock," implies that a knock value of each of the plurality of cylinders 20 is controlled within a predefined amount of each other. In one embodiment, the predefined amount is +/−25%. In a more particular embodiment, the predefined amount is +/−10%. Of course, those of skill in the art will appreciate the range of values that may be implemented with the predefined amount, such that the aforementioned two described embodiments are not meant to be exhaustive or limiting.

The engine 10 includes an IC engine which can include a diesel engine, a gasoline engine, a natural gas engine, a biofuel (e.g., biodiesel) engine, or a dual-fuel (e.g., diesel and natural gas) engine. The engine 10 includes the plurality of cylinders 20. Each cylinder 20 in the plurality of cylinders 20 is configured to receive the fuel and compress the fuel to a predetermined ratio (e.g., via a piston included in the cylinder 20). While shown as including four cylinders 20, in other embodiments, the engine 10 may include any number of cylinders, for example, 2, 4, 6, 8, 10, 12, 14, 16 or an even higher number of cylinders. In other arrangements, the concepts described herein may also be implemented with various IC engines that do not include cylinders, for example, Wankel rotary engines.

Each of the plurality of spark ignition assemblies 140 is operably coupled to a corresponding cylinder 20 of the plurality of cylinders 20. The plurality of spark ignition assemblies 140 may include a spark plug configured to provide an ignition source (e.g., an electric spark) to ignite the fuel compressed in a corresponding cylinder 20 at specific spark time determined by the controller 170.

Each of the plurality of knock sensors 130 is coupled to a corresponding cylinder 20 of the plurality of cylinders 20. In particular embodiments, the knock sensor 130 may include a piezoelectric sensor including, for example, a piezoelectric crystal and a resistor. The piezoelectric crystal is configured to generate a voltage when experiencing displacement due to a vibration caused by the knock. Each of the plurality of knock sensors 130 may be mounted on an engine cylinder head of a corresponding cylinder 20, an engine block, or an intake manifold of the engine 10 proximate to its corresponding cylinder 20.

As described before, knock is caused when the fuel in the cylinder 20 pre-ignites. This produces a characteristic vibration corresponding to the amount of knock, i.e., the explosive power of the pre-ignition. Higher knock corresponds to a stronger or larger ignition and, thereby a higher amount of vibration. The plurality of knock sensors 130 are configured to measure the vibration and produce a knock sensor signal, for example, a voltage or current, whose magnitude corresponds to the amount of vibration, i.e., the knock value in the corresponding cylinder 20.

The controller 170 is coupled to each of the plurality of knock sensors 130. The controller 170 may be operably coupled to the plurality of knock sensors and/or other components of the engine 10, or a vehicle including the engine 10 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 is configured to receive a plurality of cylinder knock values corresponding to the knock in each of the plurality of cylinders 20. For example, each of the plurality of knock sensors 130 may be operably coupled to a knock sensor controller or other circuitry (e.g., the averaging circuit 272 as described with respect to FIG. 3), coupled to the controller 170 and configured to provide the cylinder knock values. The controller 170 also receives an average knock value (e.g., from the averaging circuit 272).

In other embodiments, the controller 170 may be coupled to each of the plurality of knock sensors 130 and configured to receive the knock sensor signals (e.g., a current or voltage) therefrom. The controller 170 may be configured to determine the knock value from the knock sensors signals, for example, using an algorithm or a lookup table so as to determine the cylinder knock value therefrom. The controller 170 determines the average knock value from the cylinder knock value, the average knock value including an average of the plurality of cylinder knock values.

In particular arrangements, the controller 170 may include a low-pass filter with a long time constant, for example, in a range of 10 seconds-30 seconds. The controller 170 is configured to determine a cylinder ST offset value for each cylinder 20 in the plurality of cylinders 20 from the average knock value and the cylinder knock values. The cylinder ST offset value may comprise, for example, a difference between the average knock value and the cylinder knock value of each of the plurality of cylinders 20. The controller 170 is further configured to determine an average ST offset value. For example, the controller 170 may be configured to add the cylinder ST offset values for each of the plurality of cylinders 20 to determine a net ST offset value. The net ST offset value is then divided by the number of the plurality of cylinders 20 so as to determine the average ST offset value.

The controller 170 is configured to determine an adjusted ST value for each of the plurality of cylinders 20 by subtracting the average ST offset value from a ST value of each of the plurality of cylinders 20. The ST value may, for example, be determined from a spark timing diagram or lookup table stored in a memory of the controller 170 or an engine control unit associated with the engine 10. The ST value for each of the plurality of cylinders 20 corresponds to a time at which a spark is configured to be provided in a respective cylinder 20, which may have been determined, for example, when the engine 10 was originally assembled or calibrated. Subtracting the average ST offset value from the ST value of each cylinder (i.e., determining the adjusted ST value) either retards (e.g., if the average cylinder ST value is negative) or advances (e.g., if the average ST value is positive) the ST value i.e., the timing of the spark ignition of each cylinder 20 of the plurality of cylinders 20. In some embodiments, the controller 170 may also be coupled to each of the plurality of spark ignition assemblies 140. In such embodiments, the controller 170 may be configured to activate each of the plurality of spark ignition assemblies 140 based on the adjusted ST value for a corresponding cylinder 20 in the plurality of cylinders 20.

Figure 2:
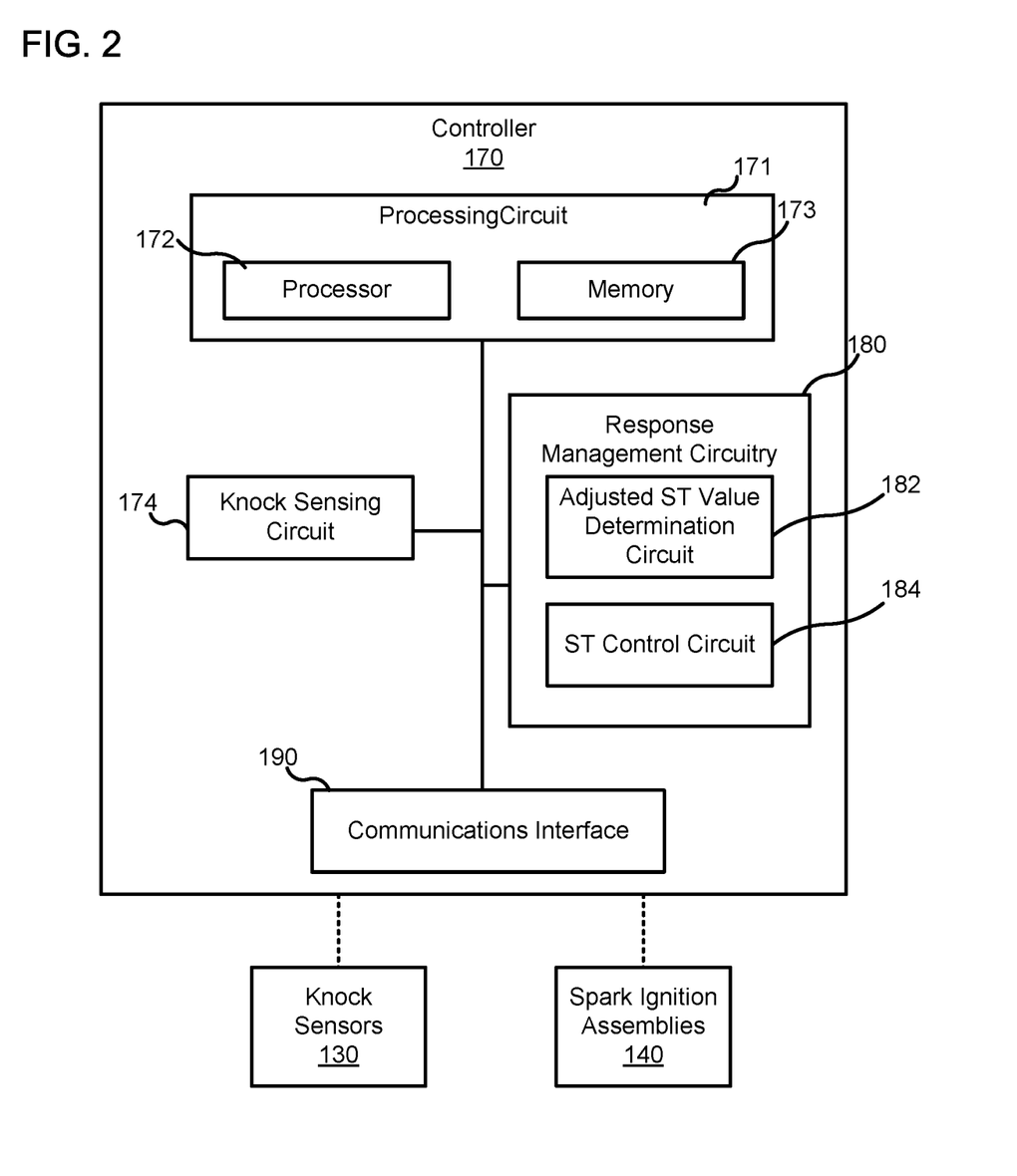
FIG. 2 is a schematic block diagram of a controller which may be used in the system of FIG. 1, according to an embodiment.

In various embodiments, the controller 170 may comprise an electronic control unit configured to receive various signals from the plurality of knock sensors 130, determine an adjusted ST value for each cylinder 20 and command the plurality of spark ignition assemblies 140 to provide an ignition spark in their corresponding cylinder 20 based on the adjusted ST value. FIG. 2 is a schematic block diagram of a controller 170, according to a particular embodiment. The controller 170 includes a processing circuit 171 having a processor 172 and a memory 173, a knock sensing circuit 174 and a communications interface 190. The controller 170 also includes a response management circuitry 180 having an adjusted ST value determination circuit 182 and a ST control circuit 184.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables (e.g., an ST lookup table or diagram), algorithms, or instructions.

In one configuration, the knock sensing circuit 174 and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration the knock sensing circuit 174 and the response management circuitry 180 are embodied as hardware units, such as electronic control units. As such, the knock sensing circuit 174 and the response management circuitry 180 may be embodied as one or more circuitry components including, but not limited to, processing circuitry, network interfaces, peripheral devices, input devices, output devices, sensors, etc. In some embodiments, the knock sensing circuit 174, and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the knock sensing circuit 174 and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the knock sensing circuit 174 and/or the response management circuitry 180 may also include programmable hardware devices such as field programmable gate arrays, programmable array logic, programmable logic devices or the like. In this regard the knock sensing circuit 174 and the response management circuitry 180 may include one or more memory devices for storing instructions that are executable by the processor(s) of the knock sensing circuit 174 and the response management circuitry 180. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect the knock sensing circuit 174 the response management circuitry 180. Thus, the depicted configuration represents the aforementioned arrangement where the knock sensing circuit 174 and the response management circuitry 180 are embodied as machine or computer-readable media. However, as mentioned above, this illustration is not meant to be limiting as the present disclosure contemplates other embodiments such as the aforementioned embodiment where the knock sensing circuit 174 and the response management circuitry 180, or at least one circuit of the knock sensing circuit 174 and the response management circuitry 180 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the knock sensing circuit 174 and the response management circuitry 180) may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 190 may include any combination of wired or wireless interfaces (e.g., jacks, antennas, transmitters, receivers, transceivers, wire terminals, etc.) for conducting data communications with various systems, devices, or networks. For example, the communications interface 190 may include an Ethernet card and port for sending and receiving data via an Ethernet-based communications network and/or a Wi-Fi transceiver for communicating with the plurality of knock sensors 130 and, optionally the plurality of spark ignition assemblies 140 or another controller (e.g., the adaptive controller 278 shown in FIG. 2). The communications interface 190 may be structured to communicate via local area networks or wide area networks (e.g., the Internet, etc.) and may use a variety of communications protocols (e.g., IP, LON, Bluetooth, ZigBee, radio, cellular, near field communication, etc.).

The knock sensing circuit 174 is structured to receive a plurality of knock sensor signals, information, data, or values (e.g., a current or a voltage) from the plurality of knock sensors 130, and determine a cylinder knock value corresponding to the knock in each of the plurality of cylinders 20 (e.g., an amount of vibration caused by the respective knock in each cylinder 20). The knock sensor signals may be received in real time such that the knock sensing circuit 174 continuously or sequentially determines the knock value in each of the plurality of cylinders 20.

The response management circuitry 180 is structured to determine an adjusted ST value for each of the plurality of cylinders 20 from, or based on the knock value for each cylinder 20, and command the plurality of spark ignition assemblies 140 to ignite the fuel in the corresponding cylinder 20 based on the adjusted ST value for each cylinder 20 so as to harmonize the knock in each of the plurality of cylinders 20.

Expanding further, the adjusted ST value determination circuit 182 may be configured to determine an average knock value from the plurality of cylinder knock values corresponding to each of the plurality of cylinders 20. The adjusted ST value determination circuit 182 may be configured to determine an average knock value comprising an average of the plurality of cylinder knock values, and determine a cylinder ST offset value for each cylinder 20 from the average knock value and the plurality of cylinder knock values. The cylinder ST offset value for each of the plurality of cylinders 20 may comprise a difference between the average knock value and the corresponding cylinder knock value.

The adjusted ST value determination circuit 182 is further configured to determine an average ST offset value. For example, the ST value determination circuit 182 may be configured to determine a net spark timing offset value by adding the cylinder spark timing offset values for each of the plurality of cylinders 20. The net spark timing offset value is divided by the number of the plurality of cylinders 20 so as to determine the average spark timing offset value. Furthermore, the adjusted ST value determination circuit 182 is configured to determine an adjusted ST offset value for each cylinder 20 by subtracting the average ST offset value from a ST value for each cylinder 20. The ST control circuit 184 may be structured to instruct each of the plurality of spark ignition assemblies 140 to introduce a spark or, otherwise ignite the fuel in each cylinder 20 based on the adjusted ST value corresponding to a respective cylinder 20 in the plurality of cylinders 20.

Figure 3:
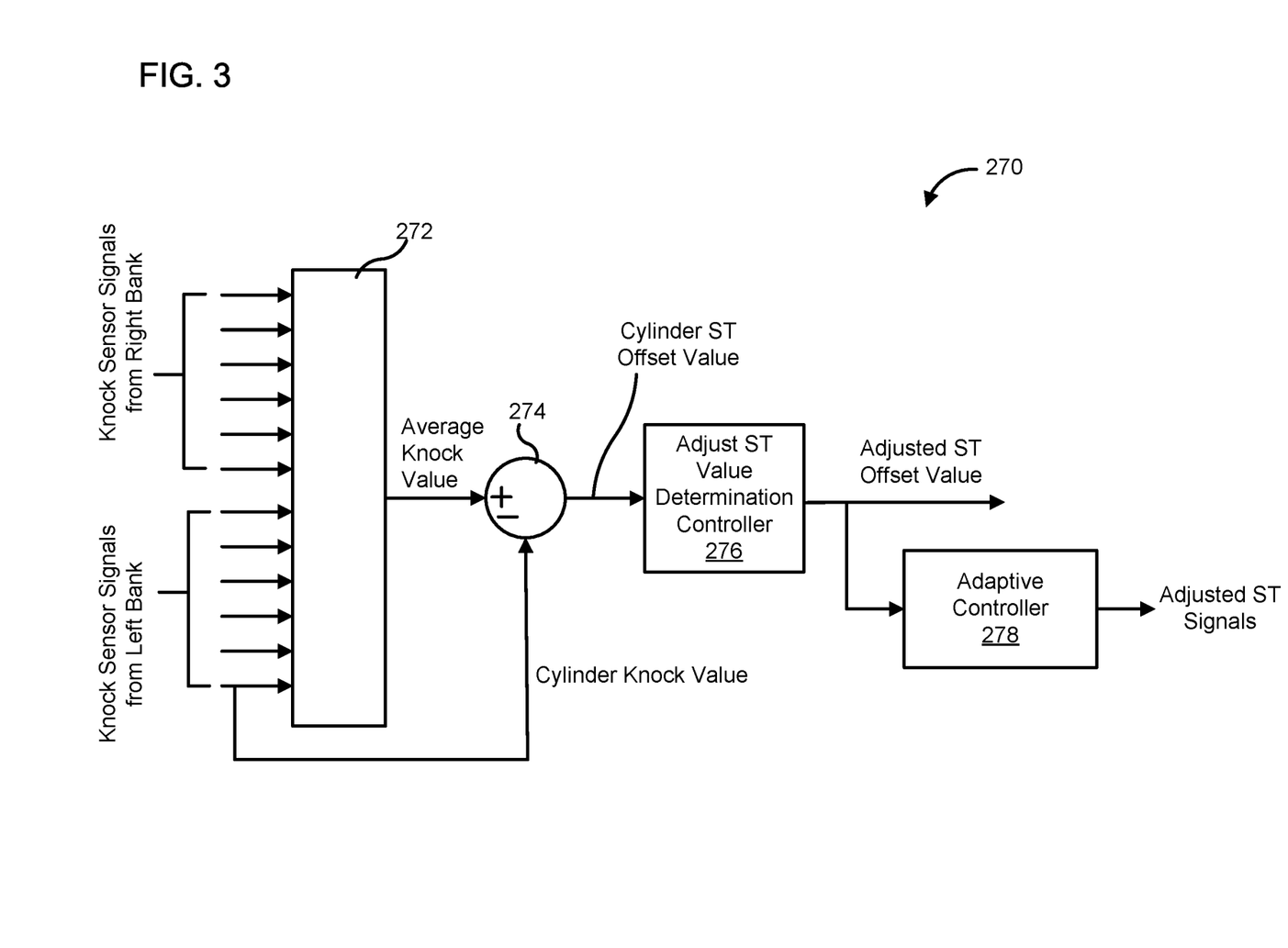
FIG. 3 is a schematic block diagram of a control system which may be used in the system of FIG. 1, according to an embodiment.

FIG. 3 is a schematic illustration of a control system 270 which may be used to determine adjusted ST values and harmonize knock in engine cylinders of an engine. The control system 270 may be used with the engine 10 or any other spark ignition engine. As shown in FIG. 3, the control system 270 includes an averaging circuit 272 configured to receive knock sensor signals, including cylinder knock values from a plurality of knock sensors (e.g., the knock sensors 130) corresponding to a plurality of cylinders (e.g., the cylinders 20) of an engine (e.g., the engine 10). FIG. 3 shows the averaging circuit 272 receiving 12 knock sensor signals including six knock sensor signals from cylinders included in a right bank of the engine and six knock sensor signals included in a left bank of the engine. In other embodiments, the control system 270 may be used with any other engine having more or less cylinders (e.g., 2, 4, 6, 8, 10, 12, 14, 16, 18 or even more cylinders).

The averaging circuit 272 is configured to determine an average knock value (e.g., an average of the knock sensor signals) from each of the cylinder knock values, as previously described herein. The averaging circuit 272 may include an operational amplifier ("op-amp") circuit having a summing amplifier or any other combination of circuits (e.g., op-amps, resistors, capacitors, etc.) configured to determine the average knock value from the individual cylinder knock values.

The control system 270 also includes a subtractor circuit 274 coupled to the averaging circuit 272. The subtractor circuit 274 may include any suitable subtracting circuit e.g., a binary subtractor circuit, a half subtractor circuit, a full subtractor circuit, etc., or a combination thereof. The subtractor circuit 274 is configured to receive the average knock value (e.g., a digital signal comprising a voltage or current representative of the average knock value) from the averaging circuit 272 and each of the cylinder knock values, and determine the cylinder ST offset value for each cylinder by subtracting the average knock value from each of the cylinder knock values.

An adjusted ST offset determination controller 276 is coupled to the subtracting circuit and configured to receive the cylinder ST offset values corresponding to each cylinder therefrom. The adjusted ST offset determination controller 276 may include, for example the adjusted ST value determination circuit 182, as previously described herein with respect to FIG. 2, and is configured to determine an adjusted ST value for each of the plurality of cylinders. For example, the adjusted ST offset determination controller 276 may be configured to add the plurality of cylinder ST offset values so as to determine a net ST offset value. The net ST value is then divided by the number of cylinders (e.g., 12 in the implementation shown in FIG. 3) so as to determine the adjusted ST offset value for each cylinder of the plurality of cylinders.

The adjusted ST offset determination controller 276 may communicate the adjusted ST values for each cylinder to a central controller (e.g., an engine control unit), for example, for storage in a memory thereof. The control system 270 also includes an adaptive controller 278 operatively coupled to the adjusted ST offset determination controller 276. The adaptive controller 278 may include, for example the ST control circuit 184 described with respect to the controller 170 of FIG. 2, and is configured to receive the adjusted ST offset values from the adjusted ST offset determination controller 276. The adaptive controller 278 may be coupled to a plurality of spark ignition assemblies (e.g., the spark ignition assemblies 140) associated with the engine, and may generate spark ignition signals configured to cause the spark ignition assemblies to generate a spark or, otherwise ignite the fuel in a corresponding cylinder based on a respective adjusted ST value thereof. It should be appreciated that one or more components of the control system 270, for example the averaging circuit 272, the subtractor circuit 274, the adjusted ST offset determination controller 276 and/or the adaptive controller 278 may be included in or used in combination with the controller 170.

Figure 4:
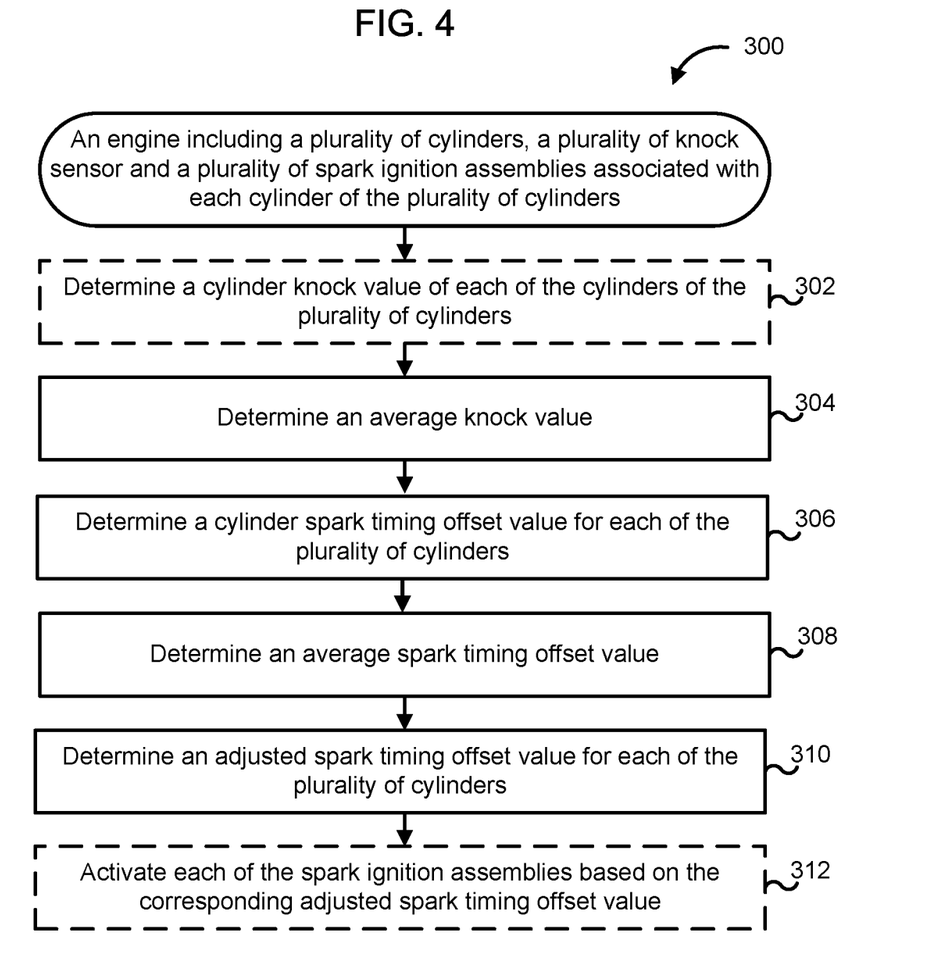
FIG. 4 is a schematic flow diagram of a method for harmonizing knock in a plurality of cylinders included in an engine, according to an embodiment.

FIG. 4 is a schematic flow diagram of an example method 300 for harmonizing knock in a plurality of cylinders (e.g., the plurality of cylinders 20) included in an engine (e.g., the engine 10). A plurality of knock sensors (e.g., the plurality of knock sensors 130) and a plurality of spark ignition assemblies (e.g., the spark ignition assemblies 140) are operably coupled to a corresponding cylinder in the plurality of cylinders. While described with respect to the engine 10, the plurality of cylinders 20, the plurality of knock sensors 130, the plurality of spark ignition assemblies 140 and the controller 170, the operations of method 300 are applicable to any engine including a plurality of cylinders, and a plurality of knock sensors, a plurality of sparking ignition assemblies and one or more controllers coupled thereto. As such, the operations of the method 300 may be implemented with the engine 10 including the plurality of cylinders 20, the plurality of knock sensors 130, the plurality of spark ignition assemblies 140 and the controller 170, and are therefore described with respect to FIGS. 1-3.

In some embodiments, the knock sensing circuit 174 determines a cylinder knock value of each cylinder 20 in the plurality of cylinders 20, at 302. For example, the knock sensing circuit 174 receives a plurality of knock sensors signal from each of the plurality of knock sensors 130 and determines the cylinder knock value of each of the plurality of cylinders 20 based on these signals, information, and/or data. The adjusted ST value determination circuit 182 determines an average knock value from the cylinder knock values, at 304. For example, the adjusted ST value determination circuit 182 may include the averaging circuit 272 configured to determine the average knock value.

The adjusted ST value determination circuit 182 determines a cylinder spark timing offset value, at 306. For example, the adjusted ST value determination circuit 182 may also include the subtractor circuit 274 configured to subtract the average knock value from each of the individual cylinder knock values so as to determine the cylinder spark timing offset value for each of the plurality of cylinders 20.

The adjusted ST value determination circuit 182 determines an average ST offset value, at 308. For example, the adjusted ST value determination circuit 182 may be configured to determine a net ST offset value by adding all the cylinder ST offset values for the plurality of cylinders 20. The adjusted ST value determination circuit 182 may then be configured to divide the net ST offset value by the number of the plurality of cylinders 20 so as to determine the average ST offset value.

The adjusted ST value determination circuit 182 determines an adjusted ST offset value for each of the plurality of cylinders 20, at 310. For example, the adjusted ST value determination circuit 182 may be configured to subtract the average ST offset value from a ST value (e.g., an initial ST value stored in a memory of the controller 170) of each of the plurality of cylinders 20 so as to determine the adjusted ST value for each of the plurality of cylinders 20.

In some embodiments, the ST control circuit 184 may activate each of the spark ignition assemblies 140 based on the adjusted ST value for each of the plurality of cylinders 20, at 312. For example, the ST control circuit 184 or the adaptive controller 278 may be operably coupled to each of the spark ignition assemblies 140 and configured to activate the spark ignition assemblies 140 based on the adjusted ST value. In this regard, "activate" includes managing or controlling the spark assemblies to provide a spark at the determined adjusted ST value thereby harmonizing the cylinders 20. Thus, this activation may include controlling the electrical impulses (e.g., voltage and current) provided to each assembly to control when the spark is provided and the duration of the spark provided. Therefore, the controller 170, the control system 270 or any other controller of the present disclosure may effectively control and manage the spark ignition assemblies 140 (e.g., spark plug, glow plug, ignitor, etc.) to achieve or substantially achieve the harmonization.

Although example controllers have been described in FIGS. 1-3, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for harmonizing knock in a plurality of cylinders included in an engine, the system comprising:
    a plurality of knock sensors; and
    a controller coupled to each of the plurality of knock sensors, the controller configured to:
        receive a plurality of cylinder knock values corresponding to each of the plurality of knock sensors,
        receive an average knock value,
        determine a cylinder spark timing offset value for each cylinder in the plurality of cylinders from the average knock value and the cylinder knock values,
        determine an average spark timing offset value, and
        determine an adjusted spark timing value for each of the plurality of cylinders by subtracting the average spark timing offset value from a spark timing value of each of the plurality of cylinders.

2. The system of claim 1, wherein the average knock value comprises an average of the plurality of cylinder knock values.

3. The system of claim 1, wherein the cylinder sparking timing offset value comprises a difference between the average knock value and the cylinder knock value of each of the plurality of cylinders.

4. The system of claim 1, wherein the controller is further configured to:
    determine a net spark timing offset value by adding the cylinder spark timing offset values for each of the plurality of cylinders; and
    dividing the net spark timing offset value by a number of the plurality of cylinders so as to determine the average spark timing offset value.

5. The system of claim 1, further comprising:
    a plurality of spark ignition assemblies, each of the plurality of spark ignition assemblies coupled to a corresponding cylinder of the plurality of cylinders,
    wherein the controller is coupled to the plurality of spark ignition assemblies, the controller further configured to:
        activate each of the plurality of spark ignition assemblies based on the adjusted spark timing value for each cylinder in the plurality of cylinders.

6. The system of claim 1, wherein the controller comprises a low pass filter with a large time constant having a range of 10 seconds-30 seconds.

7. The system of claim 1, further comprising an averaging circuit configured to determine the average knock value.

8. The system of claim 7, wherein the averaging circuit comprises an operational amplifier and a summing amplifier.

9. A control system for harmonizing knock in a plurality of cylinders included in an engine, the control system comprising:
    an averaging circuit configured to:
        receive a plurality of cylinder knock values from a plurality of knock sensors, each of the plurality of knock sensors being coupled to a corresponding cylinder of the plurality of cylinders, and
        determine an average knock value from the plurality of cylinder knock values;
    a subtractor circuit configured to determine a cylinder spark timing offset value for each cylinder in the plurality of cylinders from the average knock value and the cylinder knock values;
    an adjusted spark timing offset determination controller configured to:
        determine an average spark timing offset value, and
        determine an adjusted spark timing value for each of the plurality of cylinders by subtracting the average spark timing offset value from a spark timing value of each of the plurality of cylinders.

10. The control system of claim 9, wherein the average knock value comprises an average of the plurality of cylinder knock values.

11. The control system of claim 9, wherein the cylinder sparking timing offset value comprises a difference between the average knock value and the cylinder knock value of each of the plurality of cylinders.

12. The control system of claim 9, wherein the adjusted spark timing offset determination controller is further configured to:
    determine a net spark timing offset value by adding the cylinder spark timing offset values for each of the plurality of cylinders; and
    dividing the net spark timing offset value by a number of the plurality of cylinders so as to determine the average spark timing offset value.

13. The control system of claim 9, further comprising an adaptive controller coupled to a plurality of spark ignition assemblies, each of the plurality of spark ignition assemblies coupled to a corresponding cylinder of the plurality of cylinders,
    wherein the adaptive controller is configured to activate each of the plurality of spark ignition assemblies based on the adjusted spark timing value for each cylinder in the plurality of cylinders.

14. The control system of claim 1, wherein the averaging circuit comprises an operational amplifier and a summing amplifier.

15. A method, comprising:
    determining an average knock value based on a plurality of knock values associated with a corresponding plurality of cylinders of an engine,
    determining a cylinder spark timing offset value for each cylinder in the plurality of cylinders from the average knock value and the cylinder knock values,
    determining an average spark timing offset value, and
    determining an adjusted spark timing value for each of the plurality of cylinders by subtracting the average spark timing offset value from a spark timing value of each of the plurality of cylinders.

16. The method of claim 15, further comprising receiving a plurality of knock values from a plurality of knock sensors, each of the plurality of knock sensors coupled to a corresponding cylinder in the plurality of cylinders.

17. The method of claim 15, wherein the average knock value comprises an average of the plurality of cylinder knock values.

18. The method of claim 15, wherein the cylinder sparking timing offset value comprises a difference between the average knock value and the cylinder knock value of each of the plurality of cylinders.

19. The method of claim 15, further comprising:
   determining a net spark timing offset value by adding the cylinder spark timing offset values for each of the plurality of cylinders; and
   dividing the net spark timing offset value by a number of the plurality of cylinders so as to determine the average spark timing offset value.

20. The method of claim 15, further comprising:
   activating each of a plurality of spark ignition assemblies coupled to a corresponding cylinder in the plurality of cylinders based on the adjusted spark timing value for each cylinder in the plurality of cylinders.

\* \* \* \* \*